(12) United States Patent
Yen (10) Patent No.: US 7,279,957 B2
(45) Date of Patent: Oct. 9, 2007

(54) CHARGE PUMP FOR GENERATING ARBITRARY VOLTAGE LEVELS

(75) Inventor: Chih-Jen Yen, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 11/162,147

(22) Filed: Aug. 30, 2005

(65) Prior Publication Data

US 2007/0001745 A1    Jan. 4, 2007

(30) Foreign Application Priority Data

Jun. 29, 2005    (TW) .............................. 94121792 A (51) Int. Cl.
*G05F 1/10* (2006.01)
(52) U.S. Cl. ..................................... 327/536
(58) Field of Classification Search ................ 327/536, 327/534, 535, 537
See application file for complete search history.

(56) References Cited

U.S. PATENT DOCUMENTS

| | | | | |
|---|---|---|---|---|
| 4,807,104 A * | 2/1989 | Floyd et al. | .................. | 363/59 |
| 5,159,543 A * | 10/1992 | Yamawaki | .................... | 363/60 |
| 5,237,209 A * | 8/1993 | Brewer | ........................ | 307/110 |
| 5,262,934 A * | 11/1993 | Price | ............................. | 363/60 |
| 5,461,557 A * | 10/1995 | Tamagawa | .................... | 363/60 |
| 5,463,542 A * | 10/1995 | Okamoto | ...................... | 363/60 |
| 5,481,447 A * | 1/1996 | Caris et al. | .................... | 363/60 |
| 5,606,491 A * | 2/1997 | Ellis | ............................. | 363/60 |
| 5,856,918 A * | 1/1999 | Soneda et al. | ................ | 363/60 |
| 6,021,056 A * | 2/2000 | Forbes et al. | ................. | 363/60 |
| 6,198,645 B1 * | 3/2001 | Kotowski et al. | ............. | 363/59 |
| 6,278,318 B1 * | 8/2001 | Watanabe | .................... | 327/536 |
| 6,400,211 B1 * | 6/2002 | Yokomizo et al. | .......... | 327/536 |
| 6,642,775 B2 * | 11/2003 | Imamiya | ...................... | 327/536 |
| 6,717,458 B1 * | 4/2004 | Potanin | ....................... | 327/536 |
| 6,806,760 B2 * | 10/2004 | Sim | ........................... | 327/536 |
| 6,834,001 B2 * | 12/2004 | Myono | ........................ | 363/60 |
| 6,859,091 B1 * | 2/2005 | Nicholson et al. | .......... | 327/536 |
| 7,102,423 B2 * | 9/2006 | Lee et al. | .................... | 327/536 |

* cited by examiner

*Primary Examiner*—Jeffrey Zweizig
(74) *Attorney, Agent, or Firm*—Jianq Chyun IP Office (57) ABSTRACT

A charge pump for generating an arbitrary voltage level includes "M" pieces of pump units $PU_i$ and "M+1" pieces of first switches $S_j$. The pump unit $PU_i$ includes a first terminal $N_{i,1}$ coupled to a reference voltage $V_{i,1}$, a second terminal $N_{i,2}$ coupled to a reference voltage $V_{i,2}$, a third terminal $N_{i,3}$, a fourth terminal $N_{i,4}$ and at least one capacitor $C_i$. $C_i$ is charged by $V_{i,1}$ and $V_{i,2}$ during a first period, and a voltage is provided from $N_{i,4}$ by $C_i$ according to a voltage at $N_{i,3}$ during a second period. The first switch $S_j$ is adapted for electrically connecting the first terminal and the second terminal during the second period. The first and second terminals of $S_k$ is coupled to $N_{k-1,4}$ and $N_{k,3}$, respectively. The first terminal of $S_1$ receives the input voltage and the second terminal of $S_{M+1}$ outputs the output voltage.

26 Claims, 7 Drawing Sheets

CHARGE PUMP FOR GENERATING ARBITRARY VOLTAGE LEVELS

CROSS-REFERENCE TO RELATED APPLICATION

This application claims the priority benefit of Taiwan application serial no. 94121792, filed on Jun. 29, 2005. All disclosure of the Taiwan application is incorporated herein by reference.

BACKGROUND OF THE INVENTION

1. Field of the Invention

The present invention relates to charge pumps, and particularly to a charge pump for generating arbitrary voltage levels.

2. Description of Related Art

In an electronic circuit, power source voltages of different levels are often required; therefore, a charge pump circuit for generating power source voltages of different levels with the present power source voltage is usually equipped therein.

Figure 1A:
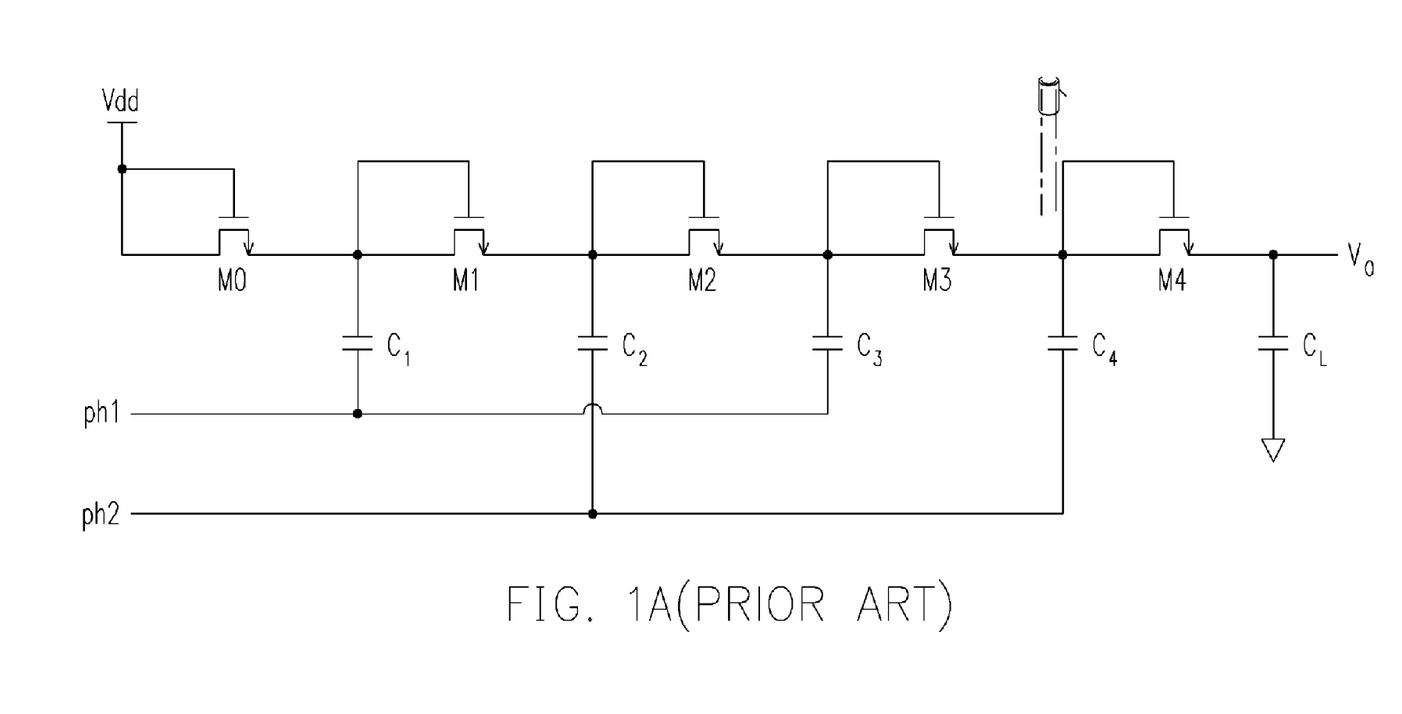
FIG. 1A is a circuit diagram of a conventional charge pump.
Figure 1B:
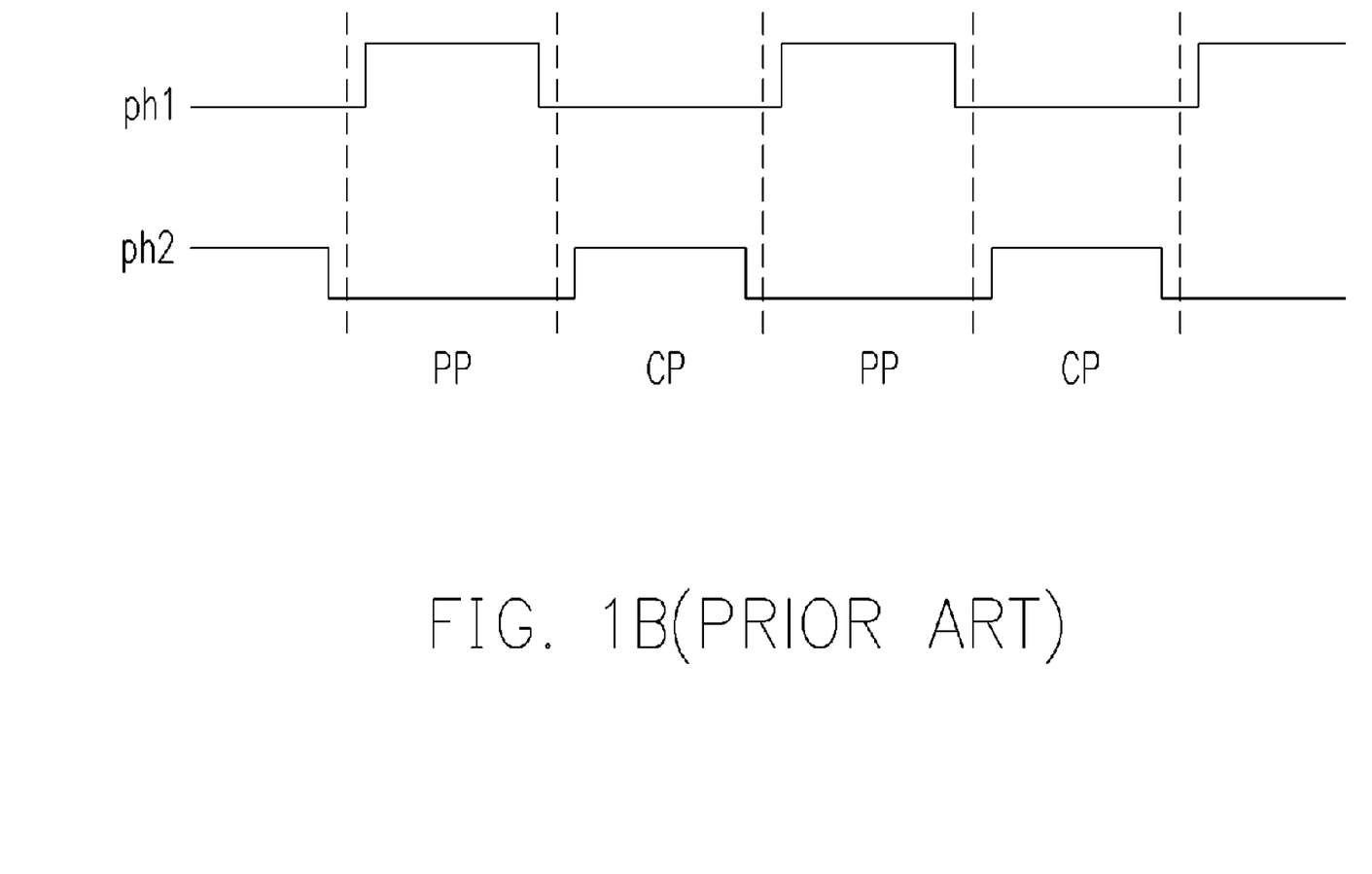
FIG. 1B is a timing sequence diagram of control signals illustrating the charge pump according to FIG. 1A.

FIG. 1A is a circuit diagram of a conventional charge pump. FIG. 1B is a timing sequence diagram of control signals for illustrating the charge pump according to FIG. 1A. Referring to FIGS. 1A and 1B together, the charge pump has five transistors; the control signals $ph_1$ and $ph_2$ are opposite in phase, wherein it is $V_{dd}$ when at high voltage level and it is zero when at low voltage level.

During the charging period (CP) of a capacitor C1, the control signals $ph_1$ and $ph_2$ are respectively at low voltage level and high voltage level. Therefore, the transistors $M_1$ and $M_3$ are turned off while the transistors $M_0$, $M_2$ and $M_4$ are turned on. The voltage at the terminal of the capacitor $C_1$ which is coupled to the control signal $ph_1$ is zero. The power source voltage $V_{dd}$ charges the capacitor $C_1$ via the transistor $M_0$ until the voltage difference between the two terminals is $V_{dd}-V_t$; wherein, $V_t$ is a threshold voltage of the transistors $M_0$ to $M_4$.

During the pumping period (PP) of the capacitor $C_1$, the control signals $ph_1$ and $ph_2$ are respectively at high voltage level and low voltage level, therefore the transistors $M_1$ and $M_3$ are turned on while the transistors $M_0$, $M_2$ and $M_4$ are turned off. The voltage at the terminal of the capacitor $C_1$ which is coupled to the control signal ph1 is $V_{dd}$. Because a charge of voltage difference of $V_{dd}-V_t$ has been stored during the charging period CP, the voltage of another terminal of the capacitor $C_1$ will raise up to $2V_{dd}-V_t$. Also, the voltage of a terminal of a capacitor $C_2$ which is coupled to the control signal $ph_2$ is zero, therefore the voltage $2V_{dd}-V_t$ of another terminal of the capacitor $C_1$ charges the capacitor $C_2$ via the transistor $M_1$ until the voltage difference between the two terminals of the capacitor $C_2$ is $2V_{dd}-2V_t$.

Then, by analyzing the voltage variation according to the foregoing method, it can be known that the output voltage $V_o$ from the charge pump is $5 \times (V_{dd}-V_t)$. Similarly, if the charge pump has N transistors, the output voltage is $N \times (V_{dd}-V_t)$. It can be known from the formula of the output voltage $V_o$ that the charge pump can only generate some power source voltages having certain voltage levels.

SUMMARY OF THE INVENTION

In view of the above, an object of the present invention is to provide a charge pump for generating arbitrary voltage levels.

The invention provides a charge pump for generating an output voltage having arbitrary voltage levels according to the input voltage. The charge pump includes "M" pieces of pump units $PU_i$ and "M+1" pieces of first switches $S_j$; wherein, $PU_i$ represents the "$i^{th}$" pump unit, "i" is an integer greater than 0 and smaller than or equal to "M", "M" is an integer greater than or equal to 1; $S_j$ represents the "$j^{th}$" first switch, "j" is an integer greater than 0 and smaller than or equal to "M+1".

The pump unit $PU_i$ includes a first terminal $N_{i,1}$ coupled to a reference voltage $V_{i,1}$, a second terminal $N_{i,2}$ coupled to a reference voltage $V_{i,2}$, a third terminal $N_{i,3}$, a fourth terminal $N_{i,4}$ and at least one capacitor $C_i$. Wherein, $N_{i,1}$, $N_{i,2}$, $N_{i,3}$, and $N_{i,4}$ respectively represent the first terminal, the second terminal, the third terminal and the fourth terminal of the $PU_i$; and $C_i$ represents an internal capacitor of the $PU_i$. The pump unit $PU_i$ is adapted for charging $C_i$ with $V_{i,1}$ and $V_{i,2}$ in a first period and providing a voltage to $N_{i,4}$ in a second period according to the voltage level of $N_{i,3}$.

The first switch $S_j$ includes a first terminal and a second terminal and is adapted for electrically connecting the first terminal and the second terminal during the second period. The first terminal of $S_1$ receives the input voltage and the second terminal of $S_1$ is coupled to $N_{1,3}$; the first terminal of $S_k$ is coupled to $N_{k-1,4}$ and the second terminal of $S_k$ is coupled to $N_{k,3}$; the first terminal of $S_{M+1}$ is coupled to $N_{M,4}$ and the second terminal of $S_{M+1}$ outputs the output voltage, wherein "k" is an integer greater than 1 and smaller than or equal to "M".

The invention employs a multi-stage pump units coupled in series with the adjustable voltages of the input terminal and the pump units; therefore, the charge pump according to the invention can generate arbitrary voltage levels.

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In order to more clearly illustrate the embodiment of the invention, a charge pump composed of three pump units is exemplified herein; those who are skilled in related art may obtain charge pumps composed of one or more pump units in accordance with the invention.

Figure 2:
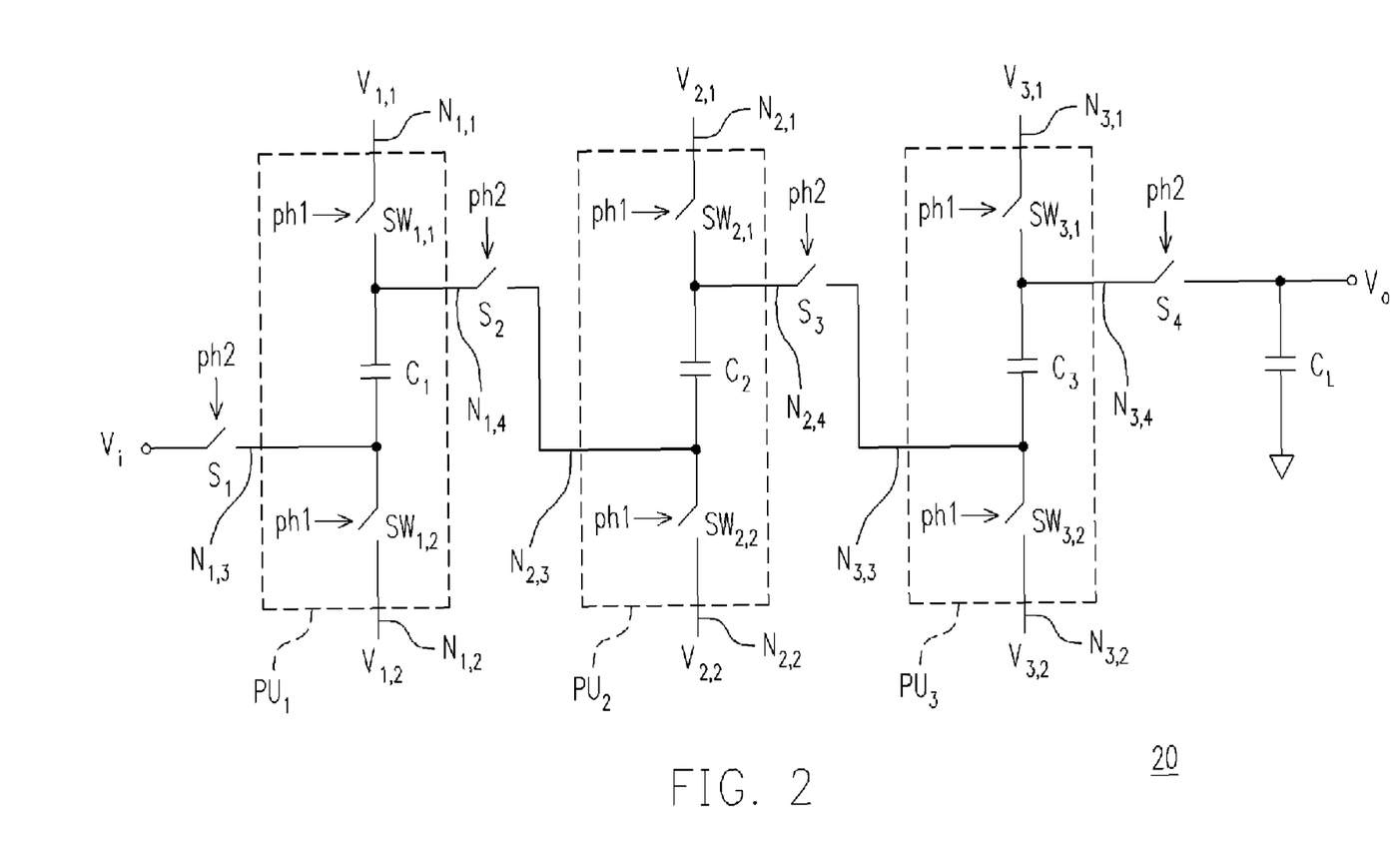
FIG. 2 is a circuit diagram of a charge pump in accordance with an embodiment of the invention.

FIG. 2 is a circuit diagram of a charge pump in accordance with an embodiment of the invention. Referring to FIG. 2, a charge pump 20 includes three pump units $PU_1$, $PU_2$, $PU_3$, four first switches $S_1$, $S_2$, $S_3$, $S_4$ and an output capacitor $C_L$. Each of the pump units $PU_i$ includes a first terminal $N_{i,1}$, a second terminal $N_{i,2}$, a third terminal $N_{i,3}$, a fourth terminal $N_{i,4}$, two second switches $SW_{i,1}$, $SW_{i,2}$ and a capacitor $C_i$, wherein, "i" is an integer and $0 < i \leq 3$. The first terminal $N_{i,1}$ is coupled to a reference voltage $V_{i,1}$ and a second terminal $N_{i,2}$ is coupled to a reference $V_{i,2}$.

Only the pump unit $PU_1$ will be illustrated as an example herein; the architecture of other pump units is similar to that of the pump unit $PU_1$ and thus description is omitted. The pump unit $PU_1$ includes a first terminal $N_{1,1}$ coupled to a reference voltage $V_{1,1}$, a second terminal $N_{1,2}$ coupled to a reference voltage $V_{1,2}$, a third terminal $N_{1,3}$, a fourth terminal $N_{1,4}$, a second switch $SW_{1,1}$, a second switch $SW_{1,2}$ and a capacitor $C_1$; wherein, the first terminal and the second terminal of the second switch $SW_{1,1}$ are respectively the first terminal $N_{1,1}$ and the fourth terminal $N_{1,4}$ of the pump unit $PU_1$; the first terminal and the second terminal of the second switch $SW_{1,2}$ are respectively the third terminal $N_{1,3}$ and the second terminal $N_{1,2}$ of the pump unit $PU_1$; and the first terminal and the second terminal of the capacitor $C_1$ are respectively coupled to the second terminal of the second switch $SW_{1,1}$ and the first terminal of the second switch $SW_{1,2}$.

First switches $S_1$, $S_2$, $S_3$ and $S_4$ are coupled respectively to the corresponding pump units $PU_1$, $PU_2$ and $PU_3$. The first terminal of the first switch $S_1$ is adapted for receiving an input voltage $V_i$ and the second terminal of the first switch $S_1$ is coupled to the third terminal $N_{1,3}$ of the pump unit $PU_1$. The first terminal and the second terminal of the first switch $S_2$ are respectively coupled to the fourth terminal $N_{1,4}$ of the pump unit $PU_1$ and the third terminal $N_{2,3}$ of the pump unit $PU_2$. The first terminal and the second terminal of the first switch $S_3$ are respectively coupled to the fourth terminal $N_{2,4}$ of the pump unit $PU_2$ and the third terminal $N_{3,3}$ of the pump unit $PU_3$. The first terminal of the first switch $S_4$ is coupled to the fourth terminal $N_{3,4}$ of the pump unit $PU_3$ and the second terminal of the first switch $S_4$ outputs the output voltage $V_o$.

The timing sequence diagram of the control signals $ph_1$ and $ph_2$ of the charge pump 20 shown in FIG. 2 may be the same as that shown in FIG. 1B. Referring to $ph_1$ and $ph_2$ which are opposite in phase, the charge pump 20 makes the second switches $SW_{1,1}$, $SW_{1,2}$, $SW_{2,1}$, $SW_{2,2}$, $SW_{3,1}$ and $SW_{3,2}$ (all of which are controlled by control signal $ph_1$) turn on, and the first switches $S_1$, $S_2$, $S_3$ and $S_4$ (all of which are controlled by control signal $ph_2$) turn off during the first period; and the second switches $SW_{1,1}$, $SW_{1,2}$, $SW_{2,1}$, $SW_{2,2}$, $SW_{3,1}$ and $SW_{3,2}$ turn off, and the first switches $S_1$, $S_2$, $S_3$ and $S_4$ turn on during the second period. Herein, when at high levels the voltages of the control signals $ph_1$ and $ph_2$ are not necessary to be $V_{dd}$, and when at low voltage levels the voltages of the control signals $ph_1$ and $ph_2$ are not required to be zero as long as the voltages at high levels can control the switches to be turned on and at low levels the switches are turned off. Furthermore, considering the design of the switches, it is not a must to turn on the switches with a high level and to turn off the switches at a low level. Such switches may be constituted of NMOS transistors, PMOS transistors, transmission gates or a combination of such components.

Moreover, a retaining circuit (e.g. an output capacitor $C_L$) is coupled between the second terminal of the first switch $S_4$ and grounding for retaining the voltage level of output voltage $V_o$ when the first switch $S_4$ is turned off. Herein, other retaining circuit design can also be adopted for obtaining similar performance. As arbitrary voltages, the input voltage $V_i$ and all the reference voltages $V_{1,1}$, $V_{1,2}$, $V_{2,1}$, $V_{2,2}$, $V_{3,1}$ and $V_{3,2}$ can be provided by a power source voltage or a voltage regulator.

Figure 3A:
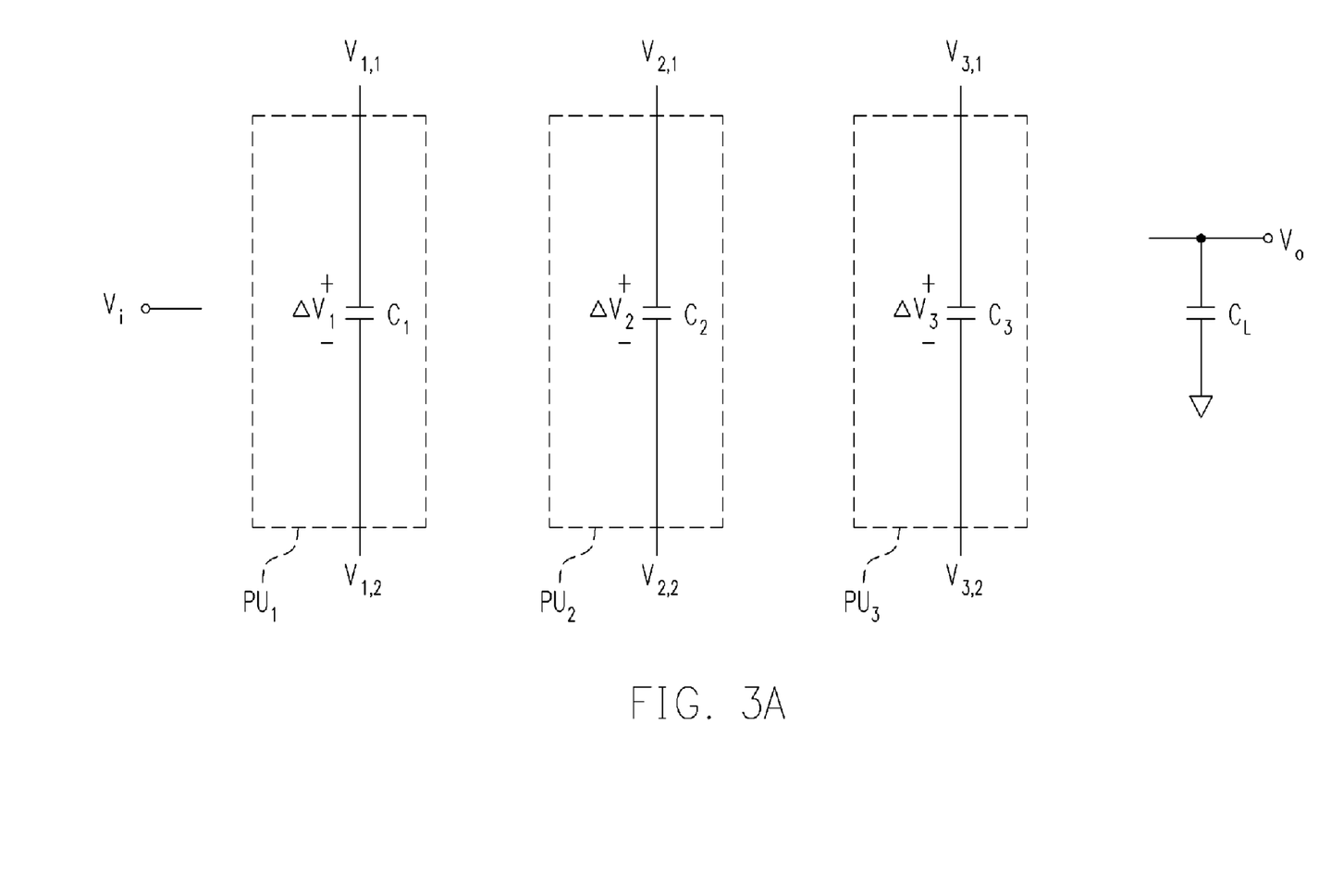
FIGS. 3A and 3B are equivalent circuit of the charge pump shown in FIG. 2 respectively during the first and the second periods, wherein the charge pump is for generating a positive voltage.
Figure 3B:
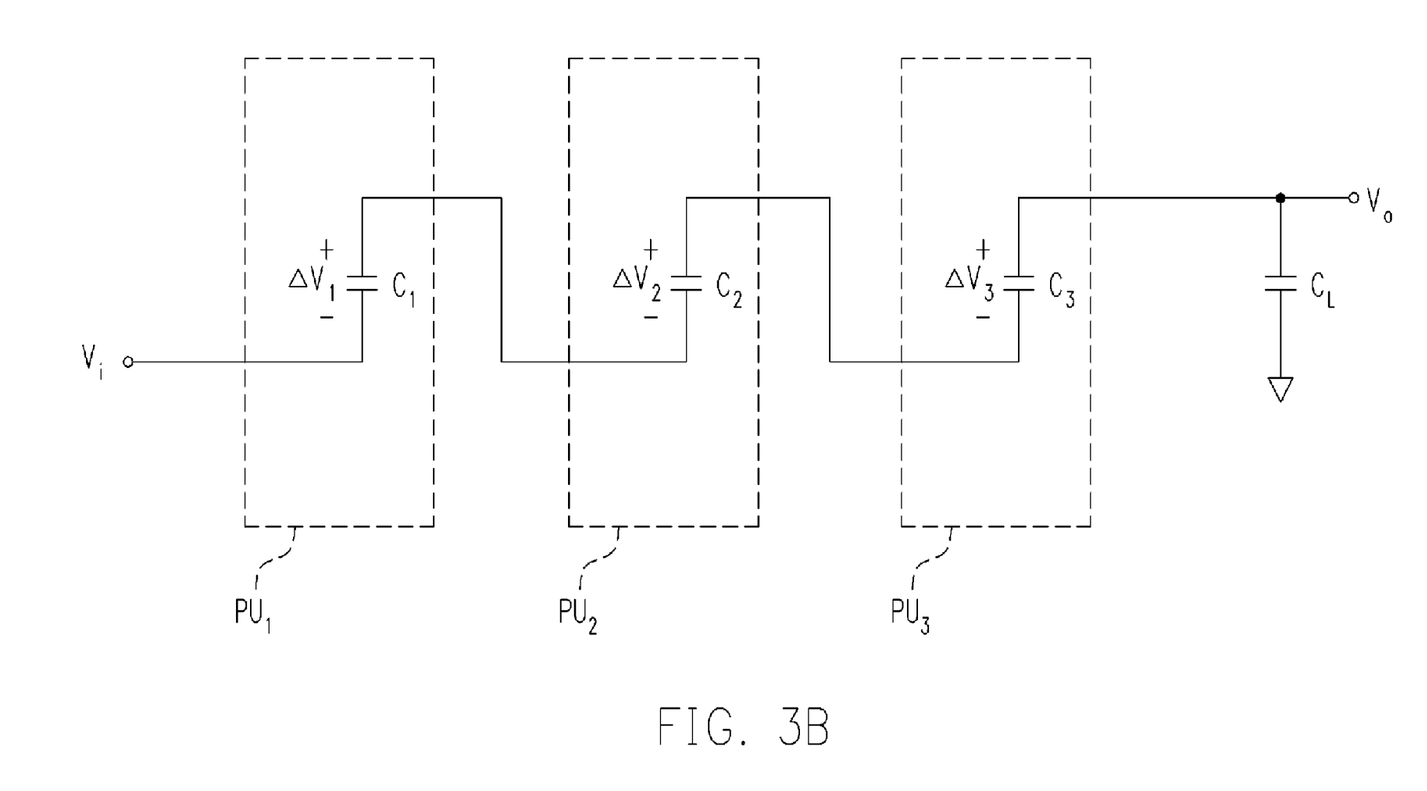

FIGS. 3A and 3B are equivalent circuit of the charge pump 20 shown in FIG. 2 respectively during the first and the second periods. Wherein, the charge pump 20 is for generating a positive voltage. To simplify the illustration, the unnecessary components, terminals and nodes are not shown in the figures.

Referring to FIG. 3A, in the first period, the second switches $SW_{i,1}$ and $SW_{i,2}$ are turned on, and the first switch $S_j$ is turned off. The equivalent circuit of the charge pump 20 is as shown in FIG. 3A. The charge pump 20 charges the capacitor $C_i$ according to reference voltages $V_{i,1}$ and $V_{i,2}$. As an example, suppose $V_{i,1} > V_{i,2}$, namely $V_{1,1} > V_{1,2}$, $V_{2,1} > V_{2,2}$, and $V_{3,1} > V_{3,2}$, then the capacitors $C_1$ to $C_3$ are respectively charged to have voltage differences $\Delta V_1$ to $\Delta V_3$, wherein $\Delta V_1 = V_{1,1} - V_{1,2}$, $\Delta V_2 = V_{2,1} - V_{2,2}$ and $\Delta V_3 = V_{3,1} - V_{3,2}$. Thus, the first period is a charging period.

Referring to FIG. 3B, in the second period, the second switches $SW_{i,1}$ and $SW_{i,2}$ are turned off, and the first switches $S_j$ is turned on. The equivalent circuit of the charge pump 20 is as shown in FIG. 3B. Herein, the pump unit $PU_i$ makes the capacitor $C_i$ provide voltage to the fourth terminal $N_{i,4}$ according to the voltage level of the third terminal $N_{i,3}$. For example, the voltage of the fourth terminal $N_{1,4}$ of the pump unit $PU_1$ is the sum of the voltage $V_i$ of the third terminal $N_{1,3}$ and the voltage difference $\Delta V_1$ of the capacitor $C_1$. Thus, the output voltage is $V_o = V_i + \Delta V_1 + \Delta V_2 + \Delta V_3$, wherein $\Delta V_1 > 0$, $\Delta V_2 > 0$, $\Delta V_3 > 0$, and the range of voltage increase can be adjusted via designing $V_i$ and $\Delta V_i$. Thus, the second period is a pumping period, and a positive voltage is produced.

In the first embodiment, $V_{i,1} = V_{dd}$ and $V_{i,2} = 0$, namely the terminals of all pump units $PU_1$ to $PU_3$ receive voltage $V_{dd}$ while the second terminals are grounded, thus $\Delta V_1 = \Delta V_2 = \Delta V_3$ and the output voltage is $V_o = V_i + 3V_{dd}$. However, the aforementioned charge pump 20 is only a special example in accordance with the invention. Practically, the invention may also connect with multiple pump units in series to increase voltage for obtaining an output voltage at arbitrary positive voltage level. For example, if a charge pump according to the invention connects with "M" pieces of pump units in series which needs "M+1" pieces of first switches, the output voltage is $V_o = V_i + M \times V_{dd}$. Accordingly, the value of "M" and the input voltage $V_i$ can be determined in accordance with the requirement of the output voltage. Generally, the input voltage $V_i$ is lower than the power source voltage $V_{dd}$.

In another embodiment, $V_{i,1} = V_i$ and $V_{i,2} = 0$, thus $\Delta V_i = V_i$. If a charge pump connects with M pieces of pump units in series, the output voltage is $V_o = V_i + M \times V_i$.

Figure 4A:
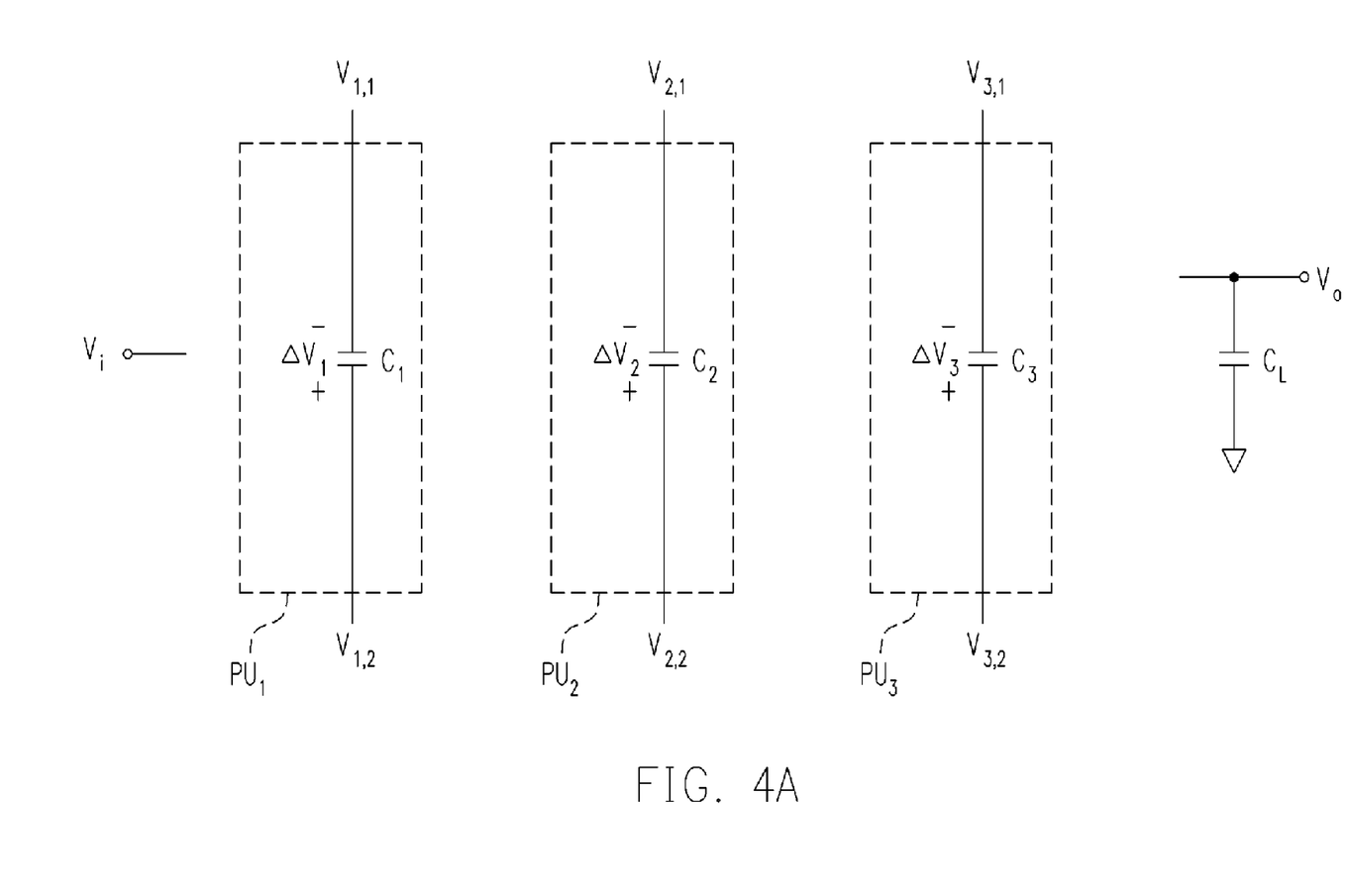
FIGS. 4A and 4B are equivalent circuit of the charge pump shown in FIG. 2 respectively during the first and the second periods, wherein the charge pump is for generating a negative voltage.
Figure 4B:
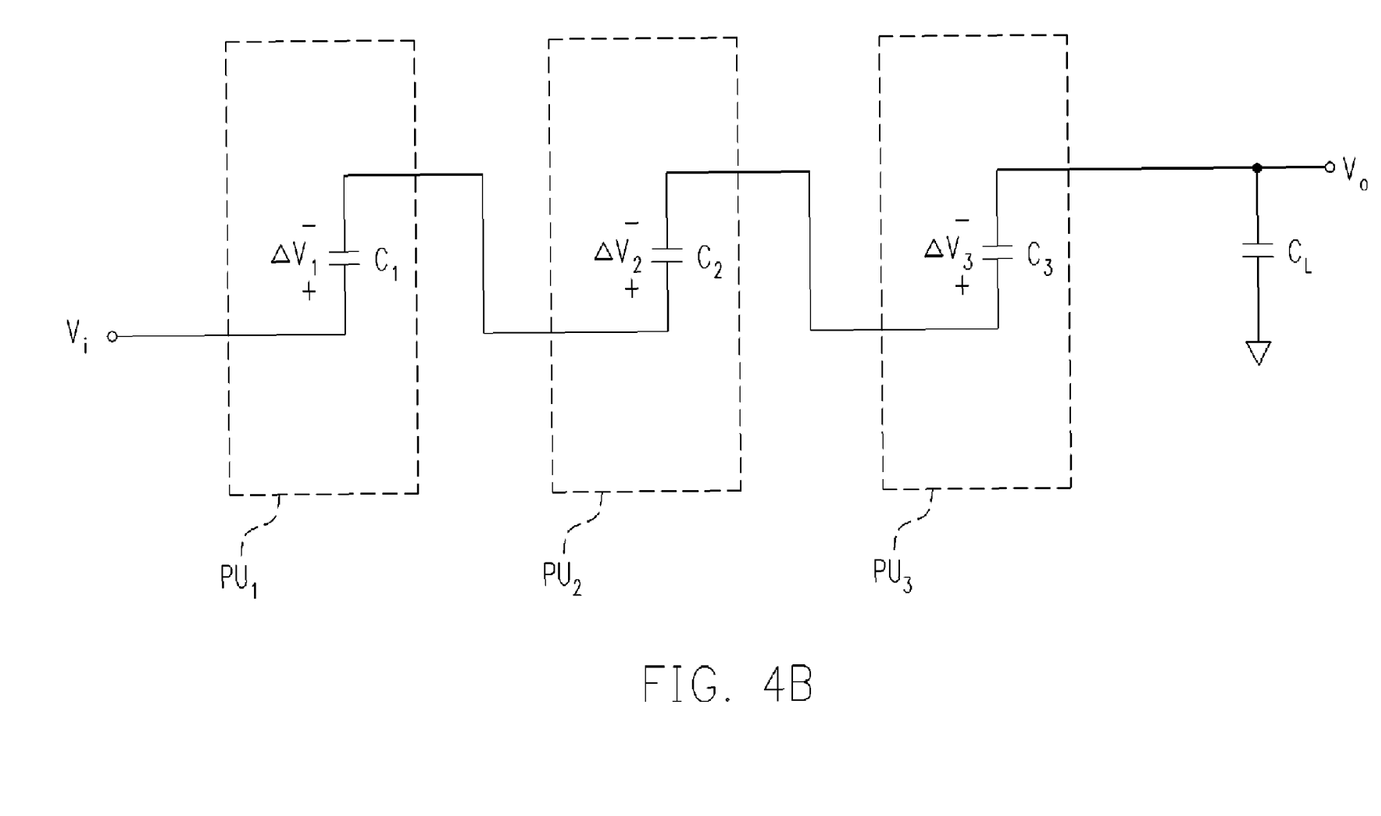

FIGS. 4A and 4B are equivalent circuit of the charge pump 20 shown in FIG. 2 respectively during the first and the second periods; wherein, the charge pump 20 is for generating a negative voltage. Referring to FIGS. 4A and 4B, the equivalent circuit is respectively similar to that in FIGS. 3A and 3B. The difference is that the reference voltages $V_{i,1}$ are smaller than $V_{i,2}$, namely $V_{1,1} < V_{1,2}$, $V_{2,1} < V_{2,2}$ and $V_{3,1} < V_{3,2}$. Hence, the capacitors $C_1$ to $C_3$ are respectively charged to have voltage differences $\Delta V_1$ to $\Delta V_3$, wherein $\Delta V_1 = V_{1,1} - V_{1,2}$, $\Delta V_2 = V_{2,1} - V_{2,2}$ and $\Delta V_3 = V_{3,1} - V_{3,2}$. However, the polarities of the capacitors $C_1$ to $C_3$ in FIG. 4A are opposite to those of the capacitors $C_1$ to $C_3$ in FIG. 3A. Therefore, as shown in FIG. 4B, in the second period, the output voltage is $V_o = V_i + \Delta V_1 + \Delta V_2 + \Delta V_3$, wherein $\Delta V_1 < 0$, $\Delta V_2 < 0$, $\Delta V_3 < 0$, and a negative voltage is produced. In an aspect of the embodiment, $V_{i,1}=0$ and $V_{i,2}=V_{dd}$, thus the output voltage $V_o=V_i-3V_{dd}$. In another aspect of the embodiment, $V_{i,1}=V_i$ and $V_{i,2}=0$, thus the output voltage $V_o=V_i-3V_i$. Of course, the invention may also connect with multiple pump units in series to decrease voltage for obtaining an output voltage at arbitrary negative voltage level.

In summary, the charge pump according to the present invention employs a plurality of pump units connected in series incorporating with adjustable input voltage $V_i$ and the adjustable reference voltages of all the pump units. Thus, arbitrary positive/negative voltage levels can be obtained.

It should be noted that specific embodiments of, and examples for, the invention are described herein for illustrative purposes, various equivalent modifications are possible within the scope of the invention, as those skilled in the relevant art will recognize that modifications and adaptations of the above-described preferred embodiments of the present invention may be made to meet particular requirements. This disclosure is intended to exemplify the invention without limiting its scope. All modifications that incorporate the invention disclosed in the preferred embodiment are to be construed as coming within the scope of the appended claims or the range of equivalents to which the claims are entitled.

What is claimed is:

1. A charge pump adapted for generating an output voltage having an arbitrary voltage level according to an input voltage and at least one reference voltage, the charge pump comprising:
    M pieces of pump units $PU_i$, wherein $PU_i$ represents the $i^{th}$ pump unit, "i" being an integer which is greater than 0 and smaller than or equal to M, M being an integer which is greater than or equal to 1, the pump unit $PU_i$ comprising:
        a first terminal $N_{i,1}$, coupled to a reference voltage $V_{i,1}$, wherein $N_{i,1}$ represents the first terminal of $PU_i$ and $V_{i,1}$ represents the voltage coupled to $N_{i,1}$;
        a second terminal $N_{i,2}$, coupled to a reference voltage $V_{i,2}$, wherein $N_{i,2}$ represents the second terminal of $PU_i$ and $V_{i,2}$ represents the voltage coupled to $N_{i,2}$;
        a third terminal $N_{i,3}$, wherein $N_{i,3}$ represents the third terminal of $PU_i$;
        a fourth terminal $N_{i,4}$, wherein $N_{i,4}$ represents the fourth terminal of $PU_i$; and
        at least one capacitor $C_i$, wherein $C_i$ represents an internal capacitor or capacitors of $PU_i$, the pump unit $PU_i$ being adapted for charging $C_1$ with $V_{i,1}$ and $V_{i,2}$ in a first period, and providing a voltage to $N_{i,4}$ according to the voltage level of $N_{i,3}$ in a second period;
    "M+1" pieces of first switches $S_j$, wherein $S_j$ represents the $j^{th}$ first switch, "j" being an integer which is greater than 0 and smaller than or equal to "M+1"; $S_j$ is adapted for electrically connecting the first terminal and the second terminal thereof during the second period, wherein the first terminal of $S_1$ receives the input voltage and the second terminal of $S_1$ is coupled to $N_{1,3}$; the first terminal of $S_k$ is coupled to $N_{k-1,4}$ and the second terminal of $S_k$ is coupled to $N_{k,3}$; the first terminal of $S_{M+1}$ is coupled to $N_{M,4}$ and the second terminal of $S_{M+1}$ outputs the output voltage, wherein "k" is an integer which is greater than 1 and smaller than or equal to "M"; and
    a voltage regulator for providing and regulating the reference voltage $V_{i,1}$ and $V_{i,2}$, wherein, when $V_{i,1}>V_{i,2}$, the output voltage is larger than the input voltage, on the contrary, when $V_{i,1}<V_{i,2}$, the output voltage is smaller than the input voltage, the output voltage being the sum of the input voltage and M pieces of voltage differences $\Delta V_i$ in which $\Delta V_i$ represents the $i^{th}$ voltage difference and $\Delta V_i = V_{i,1} - V_{i,2}$.

2. The charge pump as claimed in claim 1, wherein the first switch $S_j$ is one of a group consisting of NMOS transistors, PMOS transistors, transmission gates or a combination of such components.

3. The charge pump as claimed in claim 1, wherein the pump unit $PU_i$ further comprises:
    a second switch $SW_{i,h}$, $SW_{i,h}$ representing the "$h^{th}$" second switch of the pump unit $PU_i$, wherein "h" is 1 or 2, for electrically conducting the first terminal and the second terminal during the first period, wherein the first terminal of $SW_{i,1}$ is $N_{i,1}$, the second terminal of $SW_{i,1}$ is coupled to the first terminal of $C_i$ and the first terminal of $SW_{i,2}$ is coupled to the second terminal of $C_i$; the second terminal of $SW_{i,2}$ is $N_{i,2}$; the first terminal of $C_i$ is $N_{i,4}$; and the second terminal of $C_i$ is $N_{i,3}$.

4. The charge pump as claimed in claim 3, wherein the second switch $SW_{i,h}$ is one of a group consisting of NMOS transistors, PMOS transistors, transmission gates or a combination of such components.

5. The charge pump as claimed in claim 1, further comprising a voltage regulator coupled to the first terminal of the first switch $S_1$ for providing and adjusting the input voltage.

6. The charge pump as claimed in claim 1, wherein the input voltage is provided by a power source voltage or a ground voltage.

7. The charge pump as claimed in claim 1, wherein the reference voltages $V_{i,1}$ and $V_{i,2}$ are provided by a power source voltage or a voltage regulator.

8. The charge pump as claimed in claim 1, further comprising a retaining circuit coupled to the second terminal of the first switch $S_{M+1}$ for retaining the output voltage.

9. The charge pump as claimed in claim 8, wherein the retaining circuit comprises an output capacitor, the output capacitor being coupled between the second terminal of the first switch $S_{M+1}$ and a ground.

10. A voltage converting method adapted for generating an output voltage having an arbitrary voltage level according to an input voltage and at least one reference voltage, the voltage converting method comprises:
    providing M pieces of reference voltage $V_{i,1}$ and M pieces of reference voltage $V_{i,2}$, where i being an integer which is greater than 0 and smaller than or equal to M, M being an integer which is greater than or equal to 1;
    adjusting the voltage level of the $V_{i,1}$ and $V_{i,2}$ to result the $V_{i,1}$ is greater than the $V_{i,2}$ or the $V_{i,1}$ is less than the $V_{i,2}$;
    obtaining M pieces of voltage differences according to the voltage difference between the $V_{i,1}$ and $V_{i,2}$; and
    accumulating said M pieces of voltage differences to produce the output voltage based on the input voltage.

11. The voltage converting method as claimed in claim 10, further comprises:
    adjusting the voltage level of the input voltage.

12. The voltage converting method as claimed in claim 10, wherein M pieces of voltage difference are represented by $\Delta V_1 \sim \Delta V_M$, $\Delta V_i$ is equal to the $V_{i,1}$ subtract from the $V_{i,2}$.

13. The voltage converting method as claimed in claim 10, wherein the steps of "accumulating said M pieces of voltage difference to produce the output voltage based on the input voltage" comprises:

a. selecting one of M pieces of voltage difference as a specific voltage difference;
b. adding the input voltage and the specific voltage difference; and
c. judging whether all voltage difference are sequentially selected, wherein if all voltage difference are not sequentially selected, one voltage difference among the unselected voltage differences is selected as the specific voltage difference, and repeating steps of b and c; and if all voltage differences have been sequentially selected, making the accumulated input voltage as the output voltage.

14. A charge pump adapted for generating an output voltage having a voltage level corresponding to an input voltage and at least one reference voltage, the charge pump comprising:

M pieces of pump units $PU_i$, wherein $PU_i$ represents the $i^{th}$ pump unit, "i" being an integer which is greater than 0 and smaller than or equal to M, M being an integer which is greater than or equal to 1, the pump unit $PU_i$ comprising:

a first terminal $N_{i,1}$, coupled to a reference voltage $V_{i,1}$, wherein $N_{i,1}$ represents the first terminal of $PU_i$ and $V_{i,1}$ represents the voltage coupled to $N_{i,1}$;

a second terminal $N_{i,2}$, coupled to a reference voltage $V_{i,2}$, wherein $N_{i,2}$ represents the second terminal of $PU_i$ and $V_{i,2}$ represents the voltage coupled to $N_{i,2}$;

a third terminal $N_{i,3}$, wherein $N_{i,3}$ represents the third terminal of $PU_i$;

a fourth terminal $N_{i,4}$, wherein $N_{i,4}$ represents the fourth terminal of $PU_i$; and at least one capacitor $C_i$, wherein $C_i$ represents an internal capacitor or capacitors of $PU_i$, the pump unit $PU_i$ being adapted for charging $C_i$ with $V_{i,1}$ and $V_{i,2}$ in a first period, and providing a voltage to $N_{i,4}$ according to the voltage level of $N_{i,3}$ in a second period;

"M+1" pieces of first switches $S_j$, wherein $S_j$ represents the $j^{th}$ first switch, "j" being an integer which is greater than 0 and smaller than or equal to "M+1"; $S_j$ is adapted for electrically connecting the first terminal and the second terminal thereof during the second period, wherein the first terminal of $S_1$ receives the input voltage and the second terminal of $S_1$ is coupled to $N_{1,3}$; the first terminal of $S_k$ is coupled to $N_{k-1,4}$ and the second terminal of $S_k$ is coupled to $N_{k,3}$; the first terminal of $S_{M+1}$ is coupled to $N_{M,4}$ and the second terminal of $S_{M+1}$ outputs the output voltage, wherein "k" is an integer which is greater than 1 and smaller than or equal to "M"; and a voltage regulator, for providing and regulating the reference voltage $V_{i,1}$ and $V_{i,2}$, wherein, when $V_{i,1} > V_{i,2}$, the output voltage is larger than the input voltage, on the contrary, when $V_{i,1} < V_{i,2}$, the output voltage is smaller than the input voltage, the output voltage being the sum of the input voltage and M pieces of voltage differences $\Delta V_i$ in which $\Delta V_i$ represents the ith voltage difference and $\Delta Vi = V_{i,1} - V_{i,2}$.

15. The charge pump as claimed in claim 14, wherein the first switch $S_j$ is one of a group consisting of NMOS transistors, PMOS transistors, transmission gates or a combination of such components.

16. The charge pump as claimed in claim 1, wherein the pump unit $PU_i$ further comprises:

a second switch $SW_{i,h}$, $SW_{i,h}$ representing the "$h^{th}$" second switch of the pump unit $PU_i$, wherein "h" is 1 or 2, for electrically conducting the first terminal and the second terminal during the first period, wherein the first terminal of $SW_{i,1}$ is $N_{i,1}$, the second terminal of $SW_{i,1}$ is coupled to the first terminal of $C_i$ and the first terminal of $SW_{i,2}$ is coupled to the second terminal of $C_i$; the second terminal of $SW_{i,2}$ is $N_{i,2}$; the first terminal of $C_i$ is $N_{i,4}$; and the second terminal of $C_i$ is $N_{i,3}$.

17. The charge pump as claimed in claim 16, wherein the second switch $SW_{i,h}$ is one of a group consisting of NMOS transistors, PMOS transistors, transmission gates or a combination of such components.

18. The charge pump as claimed in claim 14, further comprising a voltage regulator coupled to the first terminal of the first switch $S_1$ for providing and adjusting the input voltage.

19. The charge pump as claimed in claim 14, wherein the input voltage is provided by a power source voltage or a ground voltage.

20. The charge pump as claimed in claim 14, wherein the reference voltages $V_{i,1}$ and $V_{i,2}$ are provided by a power source voltage or a voltage regulator.

21. The charge pump as claimed in claim 14, further comprising a retaining circuit coupled to the second terminal of the first switch $S_{M+1}$ for retaining the output voltage.

22. The charge pump as claimed in claim 21, wherein the retaining circuit comprises an output capacitor, the output capacitor being coupled between the second terminal of the first switch $S_{M+1}$ and a ground.

23. A voltage converting method adapted for generating an output voltage having a voltage level corresponding to an input voltage and at least one reference voltage, the voltage converting method comprises:

providing M pieces of reference voltage $V_{i,1}$ and M pieces of reference voltage $V_{i,2}$, where i being an integer which is greater than 0 and smaller than or equal to M, M being an integer which is greater than or equal to 1;

adjusting the voltage level of the $V_{i,1}$ and $V_{i,2}$ to result the $V_{i,1}$ is greater than the $V_{i,2}$ or the $V_{i,1}$ is less than the $V_{i,2}$;

obtaining M pieces of voltage differences according to the voltage difference between the $V_{i,1}$ and $V_{i,2}$; and accumulating said M pieces of voltage differences to produce the output voltage based on the input voltage.

24. The voltage converting method as claimed in claim 23, further comprises:

adjusting the voltage level of the input voltage.

25. The voltage converting method as claimed in claim 23, wherein M pieces of voltage difference are represented by $\Delta V_1 \sim \Delta V_M$, $\Delta V_i$ is equal to the $V_{i,1}$ subtract from the $V_{i,2}$.

26. The voltage converting method as claimed in claim 23, wherein the steps of "accumulating said M pieces of voltage difference to produce the output voltage based on the input voltage" comprises:

a. selecting one of M pieces of voltage difference as a specific voltage difference;
b. adding the input voltage and the specific voltage difference; and
c. judging whether all voltage difference are sequentially selected, wherein if all voltage difference are not sequentially selected, one voltage difference among the unselected voltage differences is selected as the specific voltage difference, and repeating steps of b and c; and if all voltage differences have been sequentially selected, making the accumulated input voltage as the output voltage.

* * * * *